(12) United States Patent
Attarwala et al.

(10) Patent No.: US 10,100,226 B2
(45) Date of Patent: Oct. 16, 2018

(54) THERMALLY RESISTANT ANAEROBICALLY CURABLE COMPOSITIONS

(71) Applicant: HENKEL IP & HOLDING GMBH, Duesseldorf (DE)

(72) Inventors: Shabbir Attarwala, Simsbury, CT (US); Qinyan Zhu, Cheshire, CT (US); Klaus Schindler, Hilden (DE)

(73) Assignee: HENKEL IP & HOLDING GMBH, Duesseldorf (DE)

( * ) Notice: Subject to any disclaimer, the term of this patent is extended or adjusted under 35 U.S.C. 154(b) by 64 days.

(21) Appl. No.: 15/145,167

(22) Filed: May 3, 2016

(65) Prior Publication Data
US 2016/0319162 A1 Nov. 3, 2016

Related U.S. Application Data

(63) Continuation of application No. 11/778,190, filed on Jul. 16, 2007, now abandoned.

(51) Int. Cl.
| | |
|---|---|
| *C09J 4/00* | (2006.01) |
| *C08F 222/12* | (2006.01) |
| *C08F 4/40* | (2006.01) |
| *C08F 222/10* | (2006.01) |
| *C08K 3/38* | (2006.01) |
| *C08F 220/14* | (2006.01) |

(52) U.S. Cl.
CPC ..................... *C09J 4/00* (2013.01); *C08F 4/40* (2013.01); *C08F 220/14* (2013.01); *C08F 222/1006* (2013.01); *C08F 2222/1013* (2013.01); *C08K 3/38* (2013.01)

(58) Field of Classification Search
CPC ......... C09J 4/00; C08F 220/12; C08F 220/14; C08F 220/20; C08F 222/10; C08F 222/1006; C08F 2222/1013; C08F 2222/1026; C08F 2222/102; C08K 3/38
See application file for complete search history.

(56) References Cited

U.S. PATENT DOCUMENTS

| | | | |
|---|---|---|---|
| 3,218,305 A | 11/1965 | Krieble | |
| 3,988,299 A | 10/1976 | Malofsky | |
| 4,180,640 A | 12/1979 | Melody et al. | |
| 4,287,330 A | 9/1981 | Rich | |
| 4,320,221 A | 3/1982 | Hoffman | |
| 4,321,349 A | 3/1982 | Rich | |
| 4,413,108 A | 11/1983 | Janssen | |
| 4,447,588 A | 5/1984 | Rametta | |
| 4,451,627 A | 5/1984 | Frisch, Jr. et al. | |
| 4,500,608 A | 2/1985 | Rametta | |
| 4,528,059 A | 7/1985 | Janssen | |
| 4,546,125 A | 10/1985 | Okamoto et al. | |
| 5,605,999 A | 2/1997 | Chu et al. | |
| 5,811,473 A | 9/1998 | Ramos et al. | |
| 6,043,327 A * | 3/2000 | Attarwala ............... | C09J 4/00 526/259 |
| 6,150,479 A | 11/2000 | Klemarczyk et al. | |
| 6,342,545 B1 | 1/2002 | Klemarczyk et al. | |
| 6,391,993 B1 | 5/2002 | Attarwala et al. | |
| 6,583,289 B1 | 6/2003 | McArdle et al. | |
| 6,835,762 B1 | 12/2004 | Klemarczyk et al. | |
| 6,852,778 B1 | 2/2005 | Kusuyama | |
| 6,897,277 B1 | 5/2005 | Klemarczyk et al. | |
| 6,958,368 B1 | 10/2005 | Klemarczyk et al. | |
| 2006/0047046 A1* | 3/2006 | Haas ..................... | B82Y 30/00 524/432 |

FOREIGN PATENT DOCUMENTS

| | | |
|---|---|---|
| EP | 0081326 B1 | 12/1999 |
| JP | 55-082157 A | 6/1980 |
| JP | 61-185573 A | 8/1986 |
| JP | 04-117474 | 4/1992 |
| JP | 0853506 A | 2/1996 |
| JP | 2002513441 A | 5/2002 |
| JP | 2006-104312 A | 4/2006 |
| WO | 9901484 A1 | 1/1999 |

OTHER PUBLICATIONS

Rich, R.D. "Anaerobic Adhesives" in Handbook of Adhesives Technology, 29, pp. 467-479, A. Pizzi and K.L. Mittal, eds., Marcel Dekker, Inc., New York, (1994).
Baccei, L.J. et al., "Anaerobic Adhesives Containing Maleimides Having Improved Thermal Resistance" in Adhesive Chemicals, pp. 589-601, Lieng-Huang Lee, ed., Plenum Press (1984).
Product Sheet: Boric Acid, CAS No. 10043-35-3. Sigma-Aldrich, 87660, Oct. 21, 1996—CKV.
International Search Report for International Patent Application No. PCT/US2008/008582 dated Jan. 9, 2009.

* cited by examiner

*Primary Examiner* — Roberto Rabago
(74) *Attorney, Agent, or Firm* — Taylor M. Coon

(57) ABSTRACT

The present invention relates to anaerobically curable compositions demonstrating resistance to elevated temperature conditions.

10 Claims, 1 Drawing Sheet

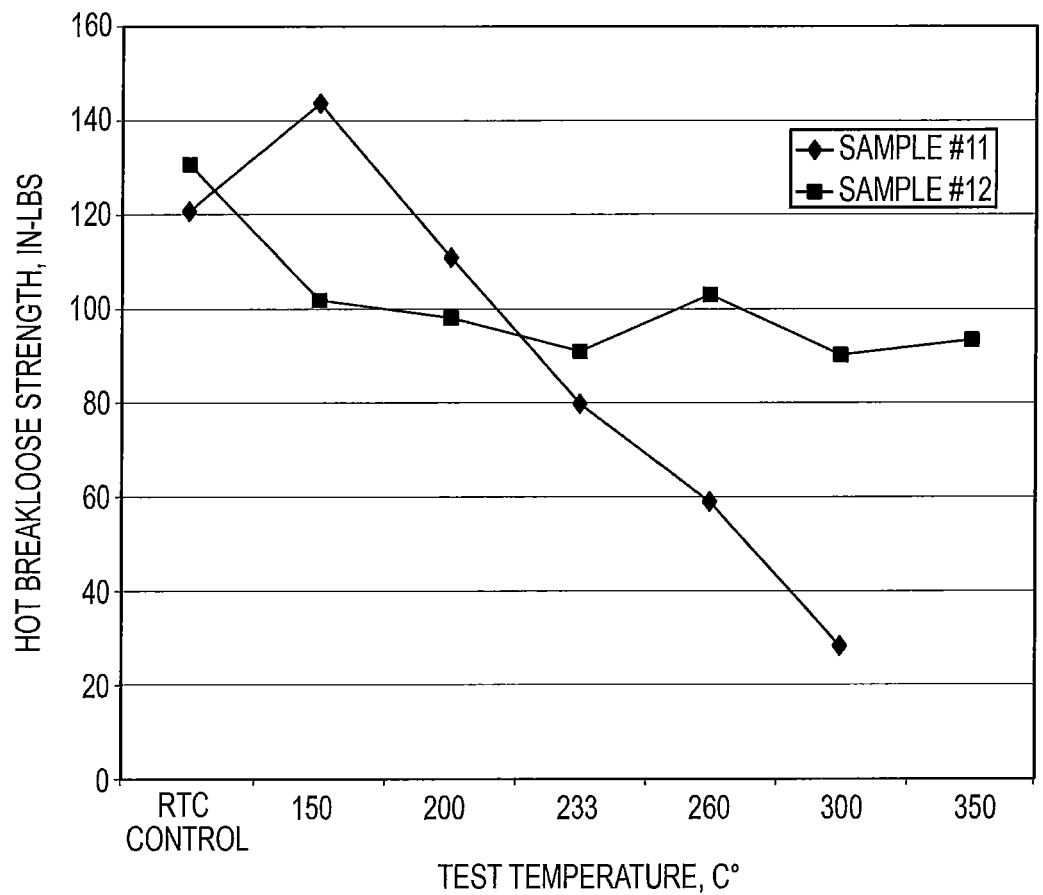

10,100,226 B2

THERMALLY RESISTANT ANAEROBICALLY CURABLE COMPOSITIONS

BACKGROUND OF THE INVENTION

Field of the Invention

The present invention relates to anaerobically curable compositions demonstrating resistance to elevated temperature conditions.

Brief Description of Related Technology

Anaerobic adhesive compositions generally are well-known. See e.g., R. D. Rich, "Anaerobic Adhesives" in *Handbook of Adhesive Technology*, 29, 467-79, A. Pizzi and K. L. Mittal, eds., Marcel Dekker, Inc., New York (1994), and references cited therein. Their uses are legion and new applications continue to be developed.

Conventional anaerobic adhesives ordinarily include a free-radically polymerizable acrylate ester monomer, together with a peroxy initiator and an inhibitor component. Oftentimes, such anaerobic adhesive compositions also contain accelerator components to increase the speed with which the composition cures.

Many adhesives particularly anaerobic adhesives, have been rendered resistant to degradation at elevated temperatures by the inclusion of certain additives. For instance, U.S. Pat. No. 3,988,299 (Malofsky) refers to a heat curable composition having improved thermal properties, which includes certain acrylate monomers and maleimide compounds.

L. J. Baccei and B. M. Malofsky, "Anaerobic Adhesives Containing Maleimides Having Improved Thermal Resistance" in *Adhesive Chemicals*, 589-601, L-H, Lee, ed., Plenum Publishing Corp. (1984) report the use of maleimides—specifically, N-phenyl maleimide, m-phenylene dimaleimide and a reaction product of methylene dianiline and methylene dianiline bismaleimide—to increase the thermal resistance of anaerobic adhesives which are fully cured at temperatures of at least 150° C.

While the addition to anaerobic adhesive compositions of such maleimide compounds to render them resistant to thermal degradation provides reaction products with acceptable performance, it would be desirable to find alternative compounds to include in such formulations.

Henkel Corporation in the past designed certain anaerobic adhesive compositions with enhanced resistance to thermal degradation. For instance, U.S. Pat. No. 6,342,545 (Klemarczyk) discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) an effective amount of latent imidazole as a thermal resistance conferring agent; and (c) a radical cure-inducing composition, such as an anaerobic cure-inducing composition. The latent imidazole is an adduct obtained by a reacting a compound having an active hydrogen together with a tertiary amino group, an epoxy compound and a carboxcylic acid anhydride. And the thermal resistance-conferring agent is selected from methyl imidizole, benzoyl imidizole, benzoyl methylimidizole, phthaloyl diimidizole and combinations thereof.

U.S. Pat. No. 6,150,479 (Klemarczyk) also discloses and claims a radical curable composition, radical cured reaction products of which demonstrate improved adhesion and resistance to thermal degradation at elevated temperatures. The composition, which may cure under anaerobic conditions, includes (a) a (meth)acrylate component; (b) a coreactant component of certain structures, examples of which include epoxidized citronellyl acrylate; epoxidized citronellyl methacrylate; cyclohexenyl methanol acrylate; cyclohexenyl methanol methacrylate; epoxidized cyclohexenyl methanol methacrylate; dihydrodicyclopentadienyl acrylate; epoxidized dihydrodicyclopentadienyl acrylate; dihydrodicylopentadienyl methacrylate; epoxidized dihydrodicylopentadienyl methacrylate; epoxidized 2-propenoic acid, 2-[(3a,3,4,5,6,7,7a-hexahydro-4,7-methano-1H-indenyl) oxy]ethyl ester; epoxidized 2-propenoic acid, 2-methyl-, 2-[(3a,3,4,5,6,7,7a-hexahydro-4,7-methano-1H-indenyl) oxy]ethyl ester and combinations thereof; and (c) a radical cure-inducing composition, such as an anaerobic cure-inducing composition. Here, the presence of the coreactant in the composition provides radical cured reaction products thereof with improved adhesion and resistance to thermal degradation. The compositions may also include a thermal resistance-conferring agent, such as one selected from imidizole derivatives (such as benzoyl imidizole, methyl imidizole, benzoyl methylimidizole, phthaloyl diimidizole and combinations thereof), latent imidizoles, and an adduct obtained by reacting a compound having an active hydrogen together with a tertiary amino group in the molecule, an epoxy compound and a carboxylic acid anhydride.

Henkel also has sold and continues to sell a product called PST with boric acid (Item No. 190901), which has among other components about 1-5% of boric acid.

U.S. Pat. No. 4,320,221 (Hoffmann) and U.S. Pat. No. 4,451,627 (Frisch) disclose anaerobic adhesives made from reaction products of isocyantes with a "polyahl". The term "polyahl" is said to generally include any polyfunctional compounds having an average greater than 1 active hydrogen moiety. Suitable compounds may be those with active hydrogens supplied from only one or from more than one type of active hydrogen moiety. Examples of compounds having more than one type of active hydrogen are reported to include amino alcohols and mercapto alcohols. Suitable polyahls also specifically include those compounds having 3 or more active hydrogen moieties per molecule. Esters of boric acid are mentioned as such reactants.

Despite the state of the art, there is an on-going search for additives to improve the thermal performance of reaction products of radical-curable adhesives, such as anaerobically curable ones.

SUMMARY OF THE INVENTION

The inventive anaerobically curable compositions include (a) a (meth)acrylate component; (b) an anaerobic cure-inducing composition; and (c) a component having the structural unit, HO—X(Y)—OH, where X is silicon or boron, and Y is =O, when X is silicon and Y is OH, when X is boron. When X is boron and Y is OH, the component is present in an amount within the range of about 25 weight percent to about 75 weight percent. The invention also provides a bond formed between two mated substrates with the inventive anaerobic composition.

This invention also provides methods of preparing and using the inventive anaerobic curable compositions as well as reaction products of the inventive anaerobic curable compositions.

The present invention will be more fully appreciated by a reading of the "Detailed Description of the Invention", and the illustrative examples which follow thereafter.

BRIEF DESCRIPTION OF THE FIGURES

FIG. 1 depicts a chart of hot strength against temperature of control Sample No. 11 and Sample No. 12, within the scope of the invention.

DETAILED DESCRIPTION OF THE INVENTION

The inventive anaerobically curable compositions include (a) a (meth)acrylate component; (b) an anaerobic cure-inducing composition; and (c) a component having the structural unit, MO—X(Y)—OM', where M and M' are independently selected from H, Na, K, or Li, X is silicon or boron, and Y is =O, when X is silicon and Y is OH, when X is boron. When X is boron and Y is OH, the component is present in an amount within the range of about 25 weight percent to about 75 weight percent.

The (meth)acrylate component may be chosen from a host of materials, such as those represented by $H_2C=CGCO_2R^1$, where G may be hydrogen, halogen or alkyl groups having from 1 to about 4 carbon atoms, and $R^1$ may be selected from alkyl, cycloalkyl, alkenyl, cycloalkenyl, alkaryl, aralkyl or aryl groups having from 1 to about 16 carbon atoms, any of which may be optionally substituted or interrupted as the case may be with silane, silicon, oxygen, halogen, carbonyl, hydroxyl, ester, carboxylic acid, urea, urethane, carbamate, amine, amide, sulfur, sulfonate, sulfone and the like.

Additional (meth)acrylate monomers suitable for use herein include polyfunctional (meth)acrylate monomers, such as, but not limited to, di- or tri-functional (meth)acrylates like polyethylene glycol di(meth)acrylates, tetrahydrofuran (meth)acrylates and di(meth)acrylates, hydroxypropyl (meth)acrylate ("HPMA"), hexanediol di(meth)acrylate, trimethylol propane tri(meth)acrylate ("TMPTMA"), diethylene glycol dimethacrylate, triethylene glycol dimethacrylate ("TRIEGMA"), tetraethylene glycol dimethacrylate, dipropylene glycol dimethacrylate, di-(pentamethylene glycol) dimethacrylate, tetraethylene diglycol diacrylate, diglycerol tetramethacrylate, tetramethylene dimethacrylate, ethylene dimethacrylate, neopentyl glycol diacrylate, trimethylol propane triacrylate and bisphenol-A mono and di(meth)acrylates, such as ethoxylated bisphenol-A (meth)acrylate ("EBIPMA"), and bisphenol-F mono and di(meth)acrylates, such as ethoxylated bisphenol-F (meth)acrylate.

Still other (meth)acrylate monomers that may be used herein include silicone (meth)acrylate moieties ("SiMA"), such as those taught by and claimed in U.S. Pat. No. 5,605,999 (Chu), the disclosure of which is hereby expressly incorporated herein by reference.

Of course, combinations of these (meth)acrylate monomers may also be used.

The (meth)acrylate component should comprise from about 10 to about 75 weight percent of the composition, such as about 50 to about 70 weight percent, based on the total weight of the composition.

The component having boron or silicon as a central atom should be capable of forming a network under elevated temperature conditions. That is, when the component contains boron, and is thus boric acid, boric oxide or borax pentahydrate and salts thereof, the component can form a network when exposed to such elevated temperature conditions, which ordinarily are for purposes of the present invention as low as 200° C., but the time for such network formation decreases with an increase in temperature.

While boric acids have been suggested for use in adhesives in the past (such as has been suggested by U.S. Borax Inc. for their OPTIBOR product), such adhesives have been starch based (ordinarily, aqueous systems) for the corrogated paper and paparboard industries. Additionally, U.S. Borax has promoted the OPTIBOR product as a peptizing agent in the manufacture of casein-based and dextrin-based adhesives. The OPTIBOR product is reported to improve the tack and green strength of the adhesive (again, an aqueous, starch-based one) by crosslinking conjugated hydroxyl groups.

Where the component having boron or silicon as a central atom is a boron-containing one, the component should be present in the inventive composition in an amount within the range of about 25 weight percent to about 75 weight percent, such as about 35 weight percent to about 60 weight percent, for instance about 40 weight percent to about 50 weight percent, based on the total weight of the composition.

Where the component having boron or silicon as a central atom is a silicon-containing one, the component may be selected from silicic acid, sodium orthosilicate, $Na_4SiO_4$; sodium metasilicate, $Na_2SiO_3$; sodium polysilicate, $(Na_2SiO_3)_n$; or sodium pyrosilicate, $Na_6Si_2O_7$.

Where the component having boron or silicon as a central atom is a silicon-containing one, the component should be present in the inventive composition in an amount within the range of about 10 weight percent to about 75 weight percent, for instance about 25 weight percent to about 60 weight percent.

Desirable anaerobic cure-inducing compositions to induce and accelerate cure of the inventive compositions may include saccharin, toluidines, such as N,N-diethyl-p-toluidine ("DE-p-T") and N,N-dimethyl-o-toluidine ("DM-o-T"), acetyl phenylhydrazine ("APH"), maleic acid, and stabilizers like quinones, such as napthaquinone and anthraquinone. See e.g. U.S. Pat. No. 3,218,305 (Krieble), U.S. Pat. No. 4,180,640 (Melody), U.S. Pat. No. 4,287,330 (Rich) and U.S. Pat. No. 4,321,349 (Rich).

In addition to the components listed in the preceding paragraph as constituents of anaerobic cure-inducing compositions, more recently Henkel Corporation has discovered a series of anaerobic cure accelerators, some of which are set forth below:

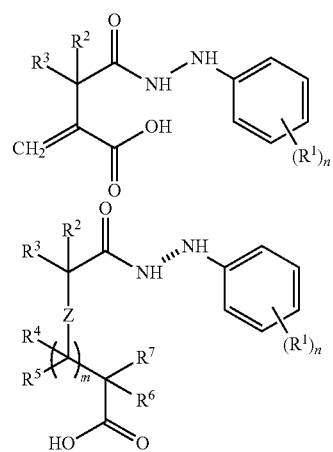

where $R^1$-$R^7$ are each independently selected from hydrogen or $C_{1-4}$; Z is a carbon-carbon single bond or carbon-carbon double bond; m is 0 or 1; and n is an integer between 1 and 5;

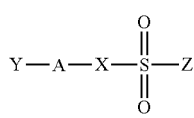

where Y is an aromatic ring, optionally substituted at up to five positions by $C_{1-6}$ alkyl or alkoxy, or halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

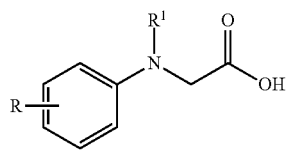

where R is hydrogen, halogen, alkyl, alkenyl, hydroxyalkyl, hydroxyalkenyl, carboxyl, or sulfonato, and $R^1$ is as defined above and alkenyl, hydroxyalkyl, hydroxyalkenyl, or aralkyl. See U.S. Pat. Nos. 6,835,762, 6,897,277 and 6,958,368.

In addition, Loctite (R&D) Ltd. designed anaerobically curable compositions using the following trithiadiaza pentalenes as a cure accelerator:

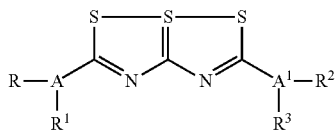

where A and $A^1$ may be selected from O and N; and

R, $R^1$, $R^2$ and $R^3$ may be the same or different, are as defined above and hydrogen, alkyl, alkenyl, cycloalkyl, cycloalkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above. See U.S. Pat. No. 6,583,289 (McArdle).

Triazine/thiol anaerobic cure systems may also be used in the practice of the present invention. For instance, U.S. Pat. Nos. 4,413,108, 4,447,588, 4,500,608 and 4,528,059, each speak to such a system, and the entirety of each of which is hereby expressly incorporated herein by reference.

The inventive compositions may also include other conventional components, such as metal catalysts, like iron and copper. Metal catalysts are generally undesirable in one-part anaerobic formulations (hence the use of sequestering agents to precipitate metals). In two-part anaerobic formulations, metal catalysts may be added to part of the formulation that does not contain an initiator, such as a peroxy compound.

A number of well-known initiators of free radical polymerization are typically incorporated into the inventive compositions including, without limitation, hydroperoxides, such as CHP, para-menthane hydroperoxide, t-butyl hydroperoxide ("TBH") and t-butyl perbenzoate. Other peroxides include benzoyl peroxide, dibenzoyl peroxide, 1,3-bis(t-butylperoxyisopropyl)benzene, diacetyl peroxide, butyl 4,4-bis(t-butylperoxy) valerate, p-chlorobenzoyl peroxide, cumene hydroperoxide, t-butyl cumyl peroxide, t-butyl perbenzoate, di-t-butyl peroxide, dicumyl peroxide, 2,5-dimethyl-2,5-di-t-butylperoxyhexane, 2,5-dimethyl-2,5-di-t-butyl-peroxyhex-3-yne, 4-methyl-2,2-di-t-butylperoxypentane and combinations thereof.

The anaerobic cure-inducing composition may be used in amounts of about 0.1 to about 10 weight percent, such as about 1 to about 5 weight percent, based on the total weight of the composition.

Additional components have been included in traditional anaerobic curable compositions to alter the physical properties of either the curable compositions or the reaction products thereof. For instance, thickeners, non-reactive plasticizers, fillers, toughening components (such as elastomers and rubbers), and other well-known additives may be incorporated therein where the art-skilled person believes it would be desirable to do so.

In addition, it may be desirable to control the strength over a certain in service temperature range. In such a case, one may wish to add a coreactant to the composition. Such a coreactant may be chosen from those disclosed and described in U.S. Pat. No. 6,043,327 (Attarwala) and U.S. Pat. No. 6,391,993 (Attarwala), the disclosures of each of which being expressly incorporated herein by reference.

For instance with reference to the '327 and '993 patents, the coreactant may be selected from

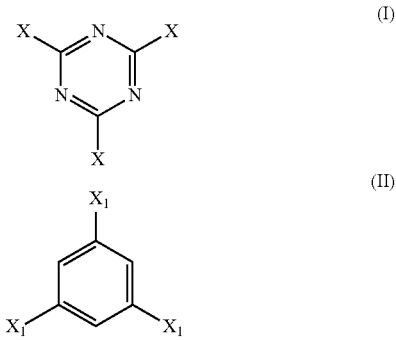

where in structure I, X can be present at least once (i.e., mono-, di-, or tri-substituted) and may be chosen from H or $D_nA$, where n can range between 0 and 1, with at least one X being $D_nA$. D, if present (i.e., if n=1), can be attached to the ring and can be chosen from O, S, or NH. A can be attached to D (if present) or directly to the ring (if D is not present, i.e., n=0). A can be represented by structure III below:

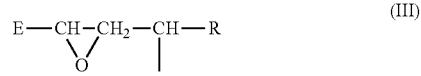

where E can be a member selected from H, linear, branched or cyclic alkyl, alkenyl, alkynyl, alkoxy or aryl groups, having from 1 to 20 carbon atoms with or without substitution by halogen, silicon, hydroxy, nitrile, ester, amide or sulfate. R can be selected from H, linear, branched or cyclic alkyl, alkenyl, alkynyl, alkoxy or aryl groups, having from 1 to about 20 carbon atoms, with or without substitution by halogen, silicon, hydroxy, nitrile, ester, amide or sulfate.

$X_1$ can be present at least once on structure II (i.e., mono-, di-, or tri-substituted) and may be chosen from H or $O=CD_nA$, with at least one $X_1$ being $O=CD_nA$, where $D_n$ and A can be as defined above.

Another suitable coreactant can be represented as:

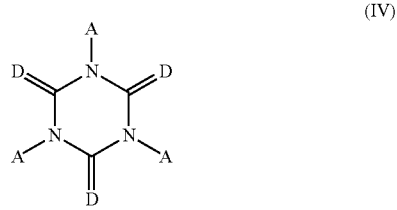
(IV)

where D and A can be as described above and can be present at least once and can also be present together attached to ring atoms which are in alpha-beta relation to one another.

Examples of particular coreactant include, but are not limited to, those shown in formulas V-VII below.

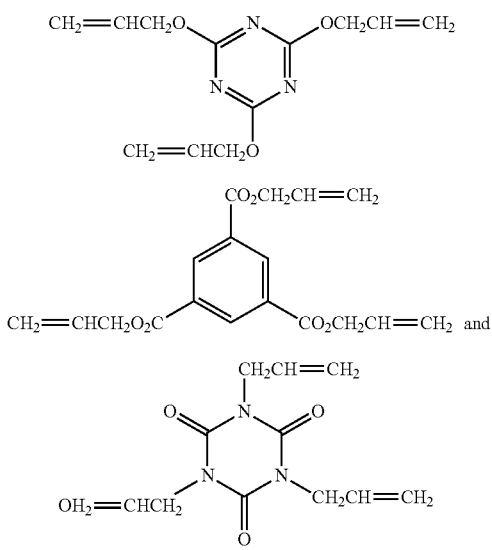

Of the coreactants represented above, particularly desirable ones are represented below by structures V [triallyl cyanurate ("TAC")], VI [triallyl trimesate ("TAT")], and VII [triallyl isocyanurate ("TAI")].

The present invention also provides methods of preparing and using the inventive anaerobic adhesive compositions, as well as reaction products of the compositions.

The compositions of the present invention may be prepared using conventional methods which are well known to those persons of skill in the art. For instance, the components of the inventive compositions may be mixed together in any convenient order consistent with the roles and functions the components are to perform in the compositions. Conventional mixing techniques using known apparatus may be employed.

The compositions of this invention may be applied to a variety of substrates to perform with the desired benefits and advantages described herein. For instance, appropriate substrates may be constructed from steel, brass, copper, aluminum, zinc, glass and other metals and alloys, ceramics and thermosets. The inventive compositions may have beneficial properties making them suitable for use in gasketing and composite applications. The compositions of this invention demonstrate particularly good bond strength on steel and aluminum. An appropriate primer may be applied to a surface of the chosen substrate to enhance the cure rate of the inventive compositions. See e.g. U.S. Pat. No. 5,811,473 (Ramos).

The invention also provides a process for preparing a reaction product from the anaerobic adhesive composition of the present invention, steps of which include applying the composition to a desired substrate surface and exposing the composition to an anaerobic environment for a time sufficient to cure the composition.

In view of the above description of the present invention, it is clear that a wide range of practical opportunities is provided. The following examples are provided for illustrative purposes only, and are not to be construed so as to limit in any way the teaching herein.

EXAMPLES

Example 1

Initially, we evaluated LOCTITE 272 with and without boric acid at different levels to determine relative hot strength values.

LOCTITE 272 is made from an aromatic dimethacrylate ester (CAS No. 24448-20-2) in an amount between 60-100%, maleimide resin (CAS No. 3006-93-7) in an amount between 10-30%, hydroxyalkyl methacrylate (CAS No. 27813-02-1) in an amount between 1-5%, cumene hydroperoxide (CAS No. 80-15-9) in an amount between 1-5%, silica (amorphous, fumed, crystalline-free) (CAS No. 112945-52-5) in an amount between 1-5%, and APH (CAS No. 114-83-0) in an amount between 0.1-1%.

In Table 1 below, LOCTITE 272 was used as one control and is referred to as Sample No. 1. Sample Nos. 2-4 were formulated with LOCTITE 272 and the amount of boric acid shown.

TABLE 1

| Sample No. | % Boric Acid |
|---|---|
| 1 | 0 |
| 2 | 5 |
| 3 | 25 |
| 4 | 50 |

With reference to Table Nos. 2 and 3 below, it may be seen that upon application to steel nuts and bolts Sample No. 1 demonstrated 107 in-lbs of breakaway strength after 4 hours at a temperature of 300° C. and only 12 in-lbs breakaway hot strength after 20 hours at a temperature of 300° C. At a temperature of 350° C., however, upon application to steel nuts and bolts Sample No. 1 demonstrated 26 in-lbs of breakaway strength after 4 hours at a temperature of 350° C. but no breakaway hot strength after 20 hours at a temperature of 350° C. Thus, in terms of retained strength, Sample No. 1 showed only 6% at 300° C. after the given time period and no retained strength at all at 350° C. after the given time period.

Each of Sample Nos. 2, 3, and 4 demonstrated an increased retention in hot strength at higher temperatures and longer ageing times, as compared to Sample No. 1. The significant improvement in percent hot strength retained at each of 300° C. and 350° C. heat ageing of Sample Nos. 3 and 4 are attributed in this invention to the 25% and 50% by weight, respectively, of boric acid in the samples.

TABLE 2

| Sample No. | Breakaway Strength, in-lbs After RTC 24 hrs | Breakaway Strength, in-lbs @ 300° C., 20 Hrs | % Hot Strength Retained @ 300° C., 20 hrs (vs. 100% Initial Strength) |
| --- | --- | --- | --- |
| 1 | 201 | 12 | 6 |
| 2 | 210 | 17 | 8 |
| 3 | 175 | 56 | 30 |
| 4 | 213 | 60 | 30 |

TABLE 3

| Sample No. | Breakaway Strength, in-lbs After RTC 24 hrs | Breakaway Strength, in-lbs @ 350° C., 20 Hrs | % Hot Strength Retained @ 350° C., 20 hrs (vs. 100% Initial Strength) |
| --- | --- | --- | --- |
| 1 | 201 | No strength | 0 |
| 2 | 210 | No strength | 0 |
| 3 | 175 | 12 | 7 |
| 4 | 213 | 38 | 18 |

In Table 4, Sample No. 5, LOCTITE PST 567, is used as one control, and Sample No. 6, PST with boric acid, is used as a second control. Sample Nos. 7-10 are shown with various weight percentages of boric acid added thereto.

TABLE 4

| | Sample No./Amt (wt %) | | | | | |
| --- | --- | --- | --- | --- | --- | --- |
| Components | 5 | 6 | 7 | 8 | 9 | 10 |
| (Meth)acrylate Anaerobic Cure Component | 80 | 76 | 72 | 60 | 40 | 32 |
| Thickeners | 20 | 19 | 18 | 15 | 10 | 8 |
| Boric Acid | 0 | 5 | 10 | 25 | 50 | 60 |

TABLE 5A

| Sample No. | Breakloose Strength, in-lbs After RTC 24 hrs | % Hot Strength Retained, 350° C. 3 days, test @ 350° C. (vs. 100% Initial Strength) |
| --- | --- | --- |
| 5 | 90 | 30% |
| 6 | 96 | 33% |
| 7 | 89 | 39% |
| 9 | 94 | 52% |
| 10 | 126 | 173% |

Sample Nos. 5-7 and 9-10 were also evaluated on stainless steel nut and bolt assemblies, pre-torqued to 44 in-lbs, at a temperature of 350° C. for a period of time of 3 days. Table 5A shows evaluation results, with Sample Nos. 9 and 10 demonstrating more than 50% hot strength retained under the test conditions, while Sample Nos. 5, 6 and 7 demonstrated below 40% hot strength retained under the same conditions.

TABLE 5B

| Sample No. | Breakloose Strength, in-lbs After RTC 24 hrs | % Hot Strength Retained, 280° C. 3 days, test @ 280° C. (vs. 100% Initial Strength) |
| --- | --- | --- |
| 5 | 45 | 80 |
| 6 | 32 | 119 |
| 8 | 49 | 134 |

Sample Nos. 5, 6 and 8 were evaluated on stainless steel nut and bolt assemblies, pre-torqued to 44 in-lbs, at a temperature of 280° C. for a period of time of 24 hours. Table 5B shows evaluation results, with Sample No. 6 and 8 demonstrating over 100% hot strength retained at a temperature of 280° C. after a period of time of 24 hours, while Sample No. 5 demonstrated 80% hot strength retained under the same conditions.

TABLE 5C

| Sample No. | Breakloose Strength, in-lbs After RTC 24 hrs | % Hot Strength Retained, 350° C. 3 days, test @ 350° C. (vs. 100% Initial Strength) |
| --- | --- | --- |
| 6 | 84 | 82 |
| 7 | 103 | 79 |
| 8 | 81 | 133 |
| 10 | 150 | 132 |

Sample Nos. 6, 7, 8 and 10 were also evaluated on stainless steel nut and bolt assemblies, pre-torqued to 44 in-lbs, at a temperature of at 350° C. for a period of time of 24 hours. Table 5C shows evaluation results of Sample Nos. 8 and 10 demonstrating more than 100% hot strength retained at 350° C. after 24 hours, Sample Nos. 6 and 7 demonstrated less than 90% hot strength retained at the same conditions.

In Table 6 below, Example 3 from Table 1 at column 14 of U.S. Pat. No. 6,043,327, representative of LOCTITE 294, is reproduced as Sample No. 11 and a formulation within the scope of the invention is shown as Sample No. 12.

TABLE 6

| | Sample No./ Amt (wt %) | |
| --- | --- | --- |
| Components | 11* | 12 |
| Polyethyleneglycol Dimethacrylate | 60 | 20 |
| Triallyl Cyanurate ("TAC") | 20 | 26 |
| Maleimide | 15 | — |
| Polyethylene powder | — | 3 |
| Thickeng agents | — | 5 |
| Boric acid | — | 44 |

*From Table 1 of U.S. Pat. No. 6,043,327; the anaeobic cure system for this system is described at column 14, lines 31-50. A comparable anaerobic cure system is used in Sample No. 12. The balance to reach 100 weight percent is made up from the anaerobic cure system.

Sample No. 11, representative of LOCTITE 294, is used as a control and contains the combination of maleimide and TAC for controlled strength heat resistance, while Sample No. 12 contains the combination of boric acid and TAC for heat resistance.

TABLE 7

| Temperature | Sample No. | |
| --- | --- | --- |
| (° C.) | 11 | 12 |
| RTC control | 121 | 131 |
| 150 | 144 | 102 |
| 200 | 111 | 98 |
| 233 | 80 | 91 |
| 260 | 59 | 103 |
| 300 | 28 | 90 |
| 350 | — | 93 |

Reference to Table 7 shows the hot breakloose strength of Sample No. 11 decreased at a temperature above 233° C., while the hot strength of Sample No. 12 was retained at temperatures up to 350° C. Reference also to FIG. 1 shows this data graphically, and highlights that the strength is by and large maintained over the temperature range evaluated.

Table No. 8 below shows a comparison of two samples, one with silicic acid (Sample No. 13) and the other (Sample No. 5) as a control, without silicic acid.

TABLE 8

| | Sample No./ Amt (wt %) | |
| --- | --- | --- |
| Component | 5 | 13 |
| (Meth)acrylate Anaerobic Cure Component | 80 | 66 |
| Thickeners | 20 | 10 |
| Silicic Acid | 0 | 26 |

TABLE 9

| Sample No. | Breakloose, in-lbs After RTC 24 hrs | % Hot Strength Retained, 350° C. 3 days, test @ 350° C. (vs. 100% Initial Strength) |
| --- | --- | --- |
| 5 | 90 | 30 |
| 12 | 126 | 100 |

With reference to Table 8, Sample No. 13 was also evaluated on stainless steel nut and bolt assemblies, pre-torqued to 44 in-lbs, at a temperature of 350° C. for a period of time of 3 days. Table 9 shows evaluation results, with Sample No. 13 surprisingly demonstrating 100% hot strength retained at 350° C. after 3 days, while Sample No. 5 demonstrated only 30% hot strength under the same conditions.

With reference to Table 10, Sample Nos. 13 and 14 are presented, with Sample No. 14 being LOCTITE 510 Gasket Eliminator Flange Sealant and Sample No. 15 being 75% by weight LOCTITE 510 Gasket Eliminator Flange Sealant and 25% by weight sodium silicate powder.

TABLE 10

| | Sample No./ Amt (wt %) | |
| --- | --- | --- |
| Components | 13 | 14 |
| LOCTITE 510 Gasket Eliminator Flange Sealant* | 100 | 75 |
| Sodium silicate, powder | 0 | 25 |

*Polyglycol dimethacrylate, 30-60%, bisphenol A fumarate resin, 10-30%, 4,4'-diphneylmethanebismaleimide, 5-10%, silica, 1-5%, saccharin, 1-5%, cumene hydroperoxide, 1-5, and APH, 0.1-1%.

TABLE 11

| Sample No. | Breakloose Strength, in-lbs After RTC 24 hrs | % Hot Strength Retained, 233° C. 3 days, test @ 233° C. (vs. 100% Initial Strength) |
| --- | --- | --- |
| 13 | 186 | 27 |
| 14 | 104 | 46 |

Sample Nos. 13 and 14 were also evaluated on stainless steel nut and bolt assemblies, pre-torqued to 44 in-lbs, at a temperature of 233° C. for a period of time of 24 hours. Table 11 shows the evaluation results, with Sample No. 14 demonstrating improved strength retained at 233° C. for a period of time of 24 hours as compared to Sample No. 13.

What is claimed is:

1. An anaerobic curable composition, comprising:
   (a) a (meth)acrylate component;
   (b) an anaerobic cure system; and
   (c) thermally resistant additives consisting of a combination of
      (i) a component comprising the structural unit, MO—X(Y)—OM', wherein M and M' are independently selected from the group consisting of hydrogen, sodium, potassium, and lithium, X is boron, and Y is OH and wherein the component is present in an amount within the range of about 25 weight percent to 75 weight percent based on the total composition, and
      (ii) a coreactant selected from the group consisting of triallyl cyanurate, triallyl trimesate, and triallyl isocyanurate.

2. The composition according to claim 1, wherein (i) is present in an amount within the range of about 35 weight percent to 60 weight percent based on the total composition.

3. The composition according to claim 1, wherein (i) is present in an amount within the range of about 40 weight percent to 50 weight percent based on the total composition.

4. The composition according to claim 1, wherein the (meth)acrylate component is represented by $H_2C=CGCO_2R^1$, wherein G is a member selected from the group consisting of H, halogen and alkyl having from 1 to about four carbon atoms, and $R^1$ is a member selected from the group consisting of alkyl, cycloalkyl, cycloalkenyl, alkenyl, and aryl groups having from 1 to about 16 carbon atoms, with or without substitution or interruption by a member selected from the group consisting of silane, silicon, oxygen, halogen, carbonyl, hydroxyl, ester, carboxylic acid, urea, urethane, carbamate, amine, amide, sulfur, sulfonate and sulfone.

5. The composition according to claim 1, wherein the (meth)acrylate component (a) is selected from the group consisting of silicone (meth)acrylates, polyethylene glycol di(meth)acrylates, bisphenol-A-(meth)acrylates, ethoxylated bisphenol-A-(meth)acrylates, bisphenol-F-(meth)acrylates, ethoxylated bisphenol-F-(meth)acrylates, tetrahydrofuran (meth)acrylates and di(meth)acrylates, hydroxypropyl (meth)acrylate, hexanediol di(meth)acrylate, and trimethylol propane tri(meth)acrylate.

6. The composition according to claim 1, wherein the anaerobic cure system comprises one or more of the following:

A. the combination of saccharin, toluidines, acetyl phenylhydrazine, maleic acid, and quinones;

B.

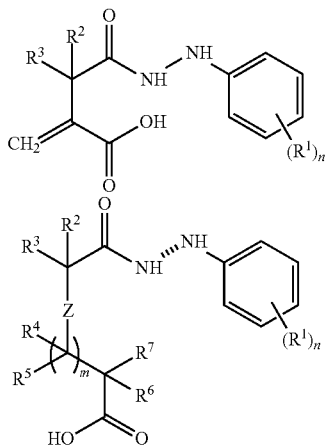

wherein $R^1$-$R^7$ are each independently selected from the group consisting of hydrogen and $C_{1-4}$ alkyl; Z is a carbon-carbon single bond or carbon-carbon double bond; m is 0 or 1; and n is an integer between 1 and 5;

C.

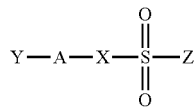

wherein Y is selected from the group consisting of an aromatic ring, optionally substituted at up to five positions by $C_{1-6}$ alkyl or alkoxy, and halo groups; A is C=O, S=O or O=S=O; X is NH, O or S and Z is an aromatic ring, optionally substituted at up to five positions by $C_{1-6}$ alkyl or alkoxy, or halo groups, or Y and Z taken together may join to the same aromatic ring or aromatic ring system, provided that when X is NH, o-benzoic sulfimide is excluded therefrom;

D.

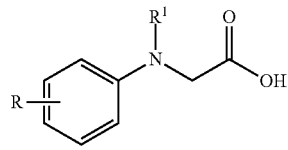

wherein R is selected from the group consisting of hydrogen, halogen, alkyl, alkenyl, hydroxyalkyl, hydroxyalkenyl, carboxyl, and sulfonato, and $R^1$ is selected from the group consisting of hydrogen, $C_{1-4}$ alkyl, alkenyl, hydroxyalkyl, hydroxyalkenyl, and aralkyl;

E. trithiadiaza pentalenes having the following structure:

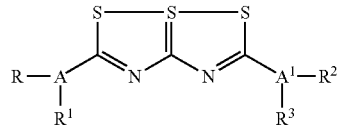

wherein A and $A_1$ are each independently selected from the group consisting of O and N; and R, $R^1$, $R^2$ and $R^3$ are the same or different, and are independently selected from the group consisting of hydrogen, alkyl, alkenyl, hydroxyalkyl, hydroxyalkenyl, aralkyl, cycloalkyl, cycloalkenyl, and aryl, having from 1 to about 30 carbon atoms, and may be substituted or interrupted with a heteroatom, and heterocyclic structures, or $R^1$ and $R^3$ taken together may join to form a cyclic structure having from about 20 to about 28 ring atoms, and together represent dialkyl substituted polyether structures that may be substituted or interrupted with the trithiadiaza pentalene structure, which itself may or may not be substituted by $A^1$, $R^2$, or $R^3$, as defined above; and F. the combination of a triazine and a thiol.

7. A reaction product of the composition according to claim 1.

8. A process for preparing a reaction product from an anaerobic curable composition, comprising the steps of:
apply an anaerobic curable composition according to claim 1, to a desired substrate surface and
exposing the composition to an anaerobic environment for a time sufficient to cure the composition.

9. A composition comprising a bond formed between two mated substrates with the composition of claim 1.

10. The composition according to claim 1 wherein (i) is boric acid and (ii) is triallyl cyanurate.

* * * * *